United States Patent
Chea, Jr.

(10) Patent No.: US 6,700,770 B2
(45) Date of Patent: Mar. 2, 2004

(54) PROTECTION OF DOUBLE END EXPOSED SYSTEMS

(75) Inventor: Ramon C. W. Chea, Jr., San Jose, CA (US)

(73) Assignee: Turnstone Systems, Inc., Santa Clara, CA (US)

( * ) Notice: Subject to any disclaimer, the term of this patent is extended or adjusted under 35 U.S.C. 154(b) by 0 days.

(21) Appl. No.: 10/104,191

(22) Filed: Mar. 22, 2002

(65) Prior Publication Data

US 2003/0179527 A1 Sep. 25, 2003

(51) Int. Cl.[7] .................................................. H02H 1/00
(52) U.S. Cl. ...................................... 361/119; 361/91.1
(58) Field of Search .................................. 361/119, 93.1, 361/93.4, 105–106; 379/372–380

(56) References Cited

U.S. PATENT DOCUMENTS

| | | | | |
|---|---|---|---|---|
| 4,322,767 A | * | 3/1982 | El Hamamsy et al. | 361/56 |
| 4,347,540 A | * | 8/1982 | Gary et al. | 361/47 |
| 2002/0075623 A1 | * | 6/2002 | Maytum et al. | 361/119 |

* cited by examiner

*Primary Examiner*—Gregory J. Toatley, Jr.
*Assistant Examiner*—Boris Benenson
(74) *Attorney, Agent, or Firm*—Pillsbury Winthrop LLP

(57) ABSTRACT

The present invention discloses systems and methods for protecting electronic devices (switching and non-switching) such as micro electro-mechanical system (MEMS) devices and solid state relays due to lightning exposure or electrical power surges in double end exposed systems. Over voltage suppressors and over current detectors are used to limit the exposure of high voltages and currents to the MEMS and solid-state relay devices in double end exposed systems.

21 Claims, 6 Drawing Sheets

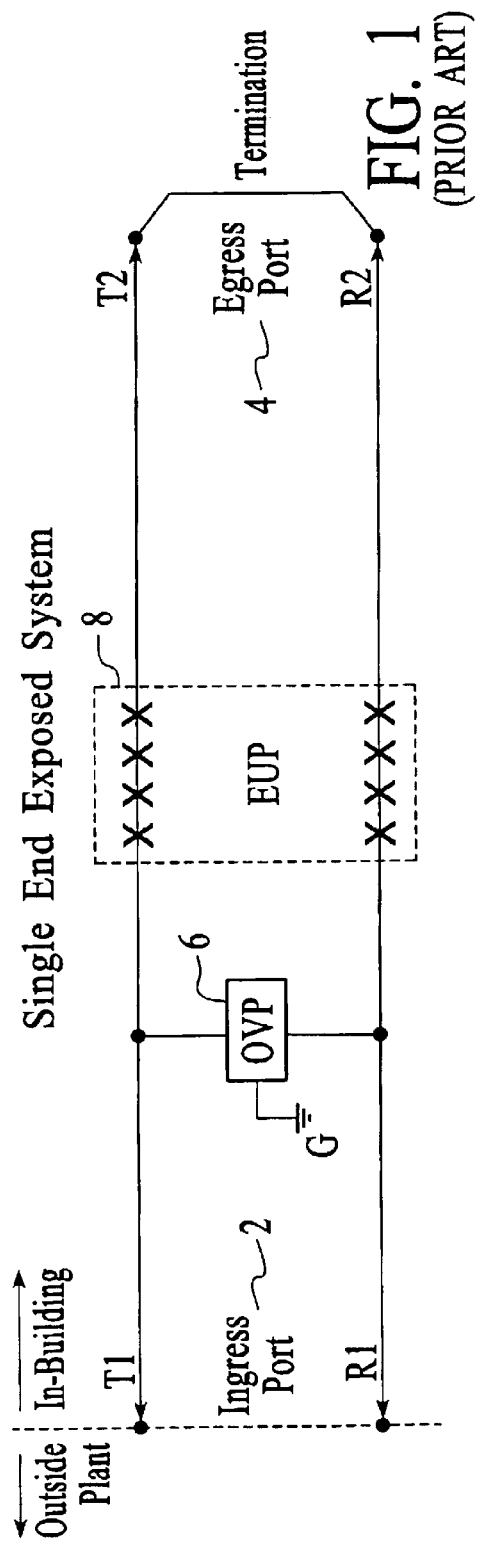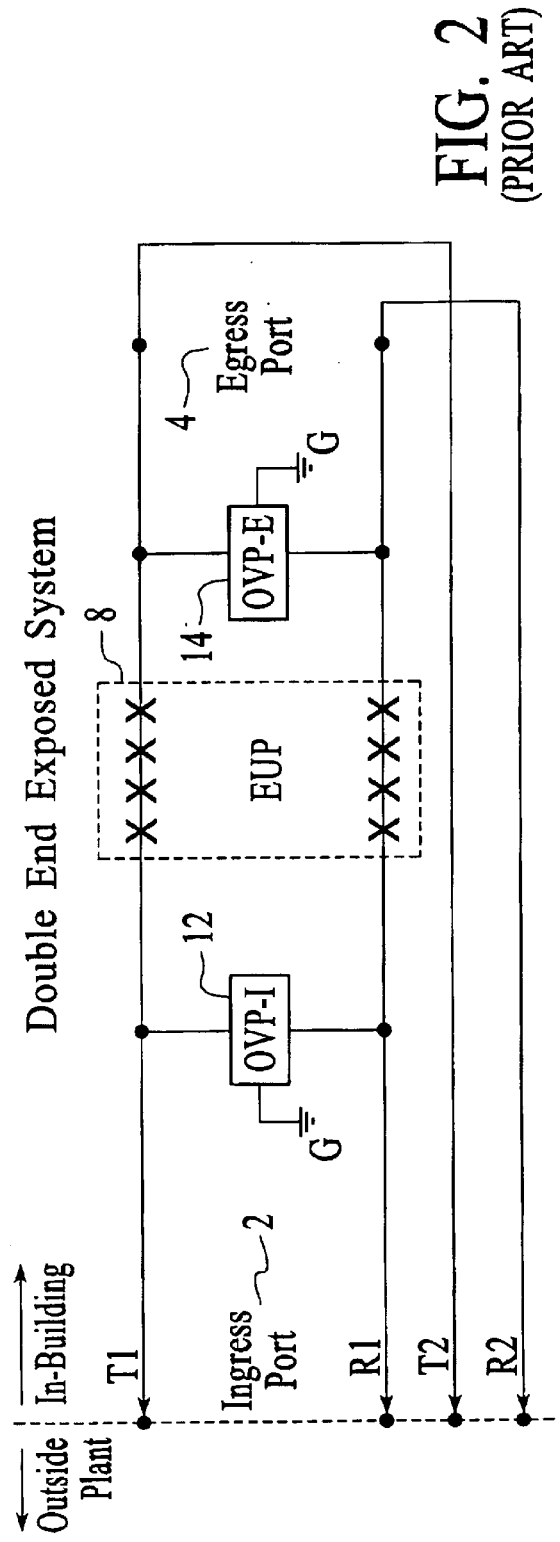

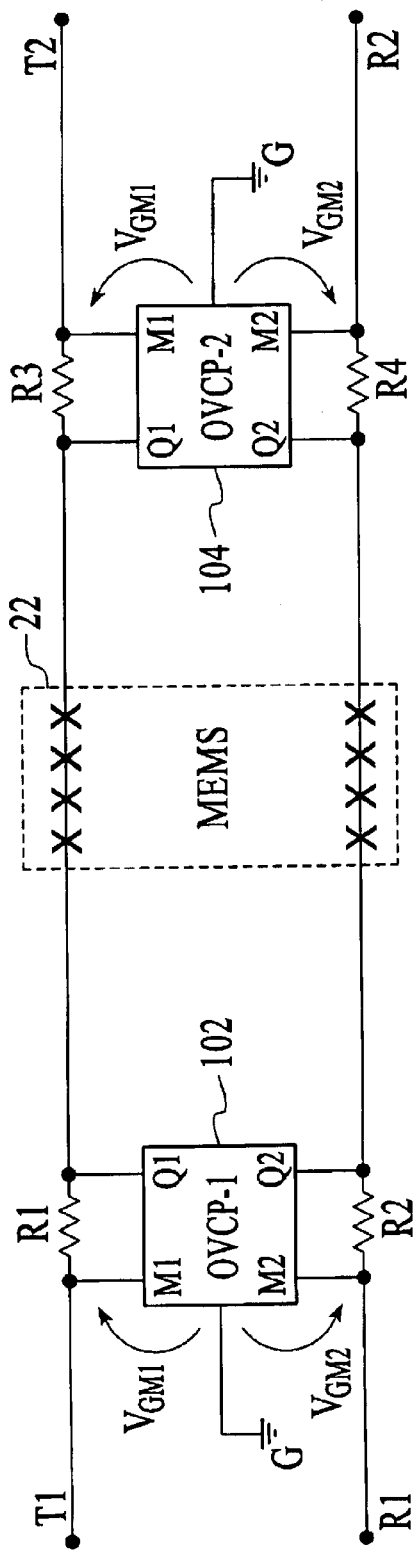
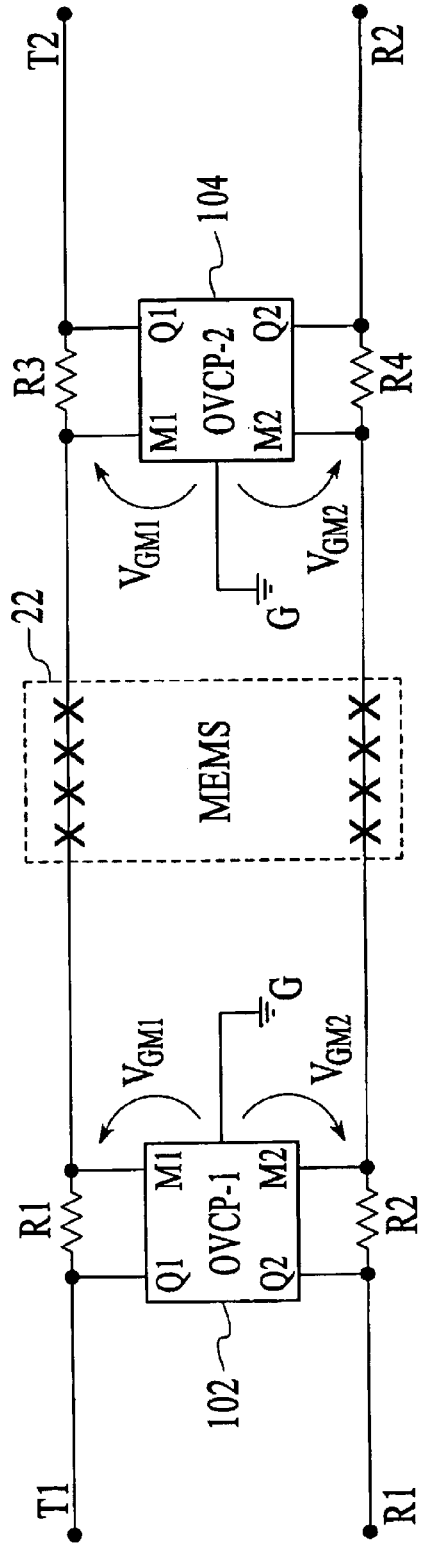
FIG. 5A
FIG. 5B

PROTECTION OF DOUBLE END EXPOSED SYSTEMS

FIELD OF THE INVENTION

The present invention relates to the field of telecommunication networks. The present invention is also directed to systems and methods for protecting devices such as micro electro-mechanical system (MEMS) and electronic relay devices in telecommunication systems. More particularly, the present invention is directed to systems and methods for protecting cross connect units that are implemented with MEMS or solid state relay devices in double end exposed systems.

BACKGROUND OF THE INVENTION

Micro electro-mechanical system (MEMS) and solid-state relay (SSR) devices are used as alternatives for conventional electromechanical switching devices. As is well known, the conventional devices possess some highly desirable characteristics such as low contact resistance, high voltage breakdown, and relatively high current handling capability, which characteristics make them ideal for use in telecommunication systems. However, such conventional devices are not well suited for miniaturization or integration.

MEMS and SSR devices can perform the standard functions of conventional relays and are well suited for miniaturization and integration. MEMS devices are basically miniaturized electro-mechanical devices that are fabricated using techniques similar to those used for semiconductor integrated circuits and are well suited for low cost and high volume production. MEMS device applications have been used as pressure sensors, chemical sensors, light reflectors, switches, and relays. MEMS devices are low cost devices due to the use of microelectronic fabrication techniques, and new functionality may also be provided because they are much smaller than conventional devices.

However, MEMS and SSR devices have several major shortcomings and disadvantages. The most notable disadvantage is that these devices are relatively fragile in current carrying and voltage breakdown capabilities. For example, because MEMS and SSR devices are relatively fragile, lightning or AC power surges can completely destroy them. Lightning is characterized by very high voltage and current of very short duration pulses, i.e., less than 1.0 ms, whereas AC power surges or faults are characterized by very high voltage and current of relatively long duration pulses, i.e., seconds. As a result, systems having MEMS or SSR devices therein can become disabled and/or destroyed quite easily.

There are currently different systems and methods for protecting MEMS and SSR devices from lightning and/or AC power surges. But, none of these conventional systems and methods is directed towards protecting MEMS and SSR devices that are implemented within units such as cross connect systems, e.g., the "CX 100 CrossConnect System" from Turnstone Systems, Inc. The CX100 Copper Cross-Connect System is a platform that automates the physical layer infrastructure in the central office, enabling ILECs (incumbent local exchange carrier) and CLECs (competitive local exchange carrier) to remotely control, test, and manage a copper loop. Additional information regarding Turnstone System's CX100 Copper CrossConnect System can be found at its web site turnstone.com. It is also noted that other systems and units providing similar functionalities as the CX100 Copper CrossConnect System can be implemented in the present invention.

In cross connect applications, the system can be configured in either a "single end exposed system" or a "double end exposed system." For a more comprehensive understanding of the above-identified systems and the present invention, the following terms have been defined as follows:

(1) a "pass-through system" is a system that provides connection between an input port and an output port through a pair of metallic conductors characterized by relatively low ohmic resistance;

(2) an "ingress port" is a signal entering an equipment; and (3) an "egress port" is a signal exiting an equipment.

FIG. 1 illustrates a simplified block diagram of a conventional single end exposed system. The single end exposed system is a system where one port, such as the ingress port 2, is connected to an "outside plant" equipment, and the other port, such as the egress port 4, is connected to an "in-building" equipment or termination unit, such as a Central Office (CO) equipment. In this diagram, the ingress port 2 is identified by terminals T1 and R1, while the egress port 4 is identified by terminals T2 and R2.

In greater detail, the ingress port 2 provides connection to the "outside plant", an over voltage protector ("OVP") 6, and an Equipment Under Protection ("EUP") 8. The egress port 4 provides connection to the EUP 8 and the termination within the "in-building" equipment. The EUP 8 represents a metallic cross connect unit or the like and is implemented with MEMS or SSR devices. As discussed above, over voltage and/or over current can easily damage the MEMS or SSR devices within the EUP 8. Typically, the OVP 6 protects the MEMS or SSR devices from over voltage conditions. An over current protector ("OCP") (not shown) can also be used to protect the MEMS or SSR devices from over current conditions. The OCP function is usually performed by the termination unit with a current limiter, such as a resistor of appropriate value.

The OVP 6 is implemented only in between the ingress port 2 and the EUP 8. Since the connection between the egress port 4 and the EUP 8 is generally not exposed to voltage surges, another OVP is not required in between the egress port 4 and the EUP 8. A co-pending U.S. patent application Ser. No. 09/677,483, commonly owned by the assignee of record, discloses improved methods and systems for protecting MEMS and SSR devices in the single end exposed system.

FIG. 2 illustrates a simplified block diagram of a conventional double end exposed system. The double end exposed system is a system where both ports, ingress 2 and egress 4, are connected to the "outside plant" equipment. The double end exposed system includes over voltage protectors, OVP-I 12 and OVP-E 14, near the ingress and egress ports, respectively, which ports can be exposed to lightning and AC power surges. In other words, lightning and AC power surges can enter from either side of the EUP 8 and thus, both sides of the EUP 8 need to be protected.

FIG. 3 illustrates a more detailed diagram of the conventional double end exposed system of FIG. 2. In FIG. 3, the term "OP" replaces the term "OVP" of FIG. 2 for ease of explanation. As illustrated, the ingress port represented by terminals T1 and R1 can be connected to the $V_s$ and Rs, where $V_s$ represents a surge source generator and Rs represents the corresponding source resistance. Likewise, the egress port represented by terminals T2 and R2 can be connected to a termination equipment 20. The over voltage protectors are represented by OP1 and OP2 in proximity to the ingress port, and by OP3 and OP4 in proximity to the egress port. In addition, the resistors RC1 and RC2 represent the finite contact resistance associated with the MEMS device 22. The EUP 8 is represented by the MEMS device 22 for ease of explanation.

The over voltage protectors or OPs are characterized by many parameters, but the key parameters for the purposes of understanding the present invention is the break-over or switching voltage represented by $V_{bo}$ and the device on-state voltage represented by $V_{on}$. Other key parameters include the current handling capability, switching speed, and the standoff voltage $V_{drm}$. The standoff voltage $V_{drm}$ is defined as the maximum voltage across the device without having to turn the device "on," and the break-over voltage $V_{bo}$ is defined as the minimum voltage across the device to turn it on (i.e., device changing from "off" to "on" state). The selection of this voltage is dictated by the maximum voltage that the MEMS device 22 can withstand without failure. The on-state voltage $V_{on}$ is the voltage drop across the device when it is turned on and is generally in the range of 1.0 to 3.0 volts, depending on the amount of current flowing through the device.

For typical CO application, the required standoff voltage $V_{drm}$ is approximately 200V minimum. The break-over voltage $V_{bo}$ is selected to be approximately 300V maximum, which can "fire" (break-over/switchover) to turn itself on. In fact, the device can turn itself on anywhere between 220V to 300V. This wide break-over voltage $V_{bo}$ range is dictated by technology and manufacturing tolerances.

A closer view of the diagram of FIG. 3 reveals that the circuit is symmetrical with respect to the ground G. In an effort to simplify the explanation of the problem associated with this system, FIG. 4 illustrates a section (upper half) of the conventional double end exposed system of FIG. 3. FIG. 4 illustrates the terminals T1 and T2 in parallel to the ground G. As illustrated, the surge source $V_s$ is positioned in between the terminal T1 and the ground G through its source resistance Rs. The resistor RC1 is the equivalent MEMS contact resistance, and the over voltage protectors OP1 and OP3 are assumed to include the same characteristics, nominally. Due to inherent tolerance associated with the break-over voltage $V_{bo}$ of both the over voltage protectors OP1 and OP3, the following scenarios can exist.

First, when the surge source $V_s$ is less than the break-over voltage $V_{bo}$ of either of the over voltage protectors OP1 or OP3, no currents are flowing within the circuit. In other words, this means that currents i0=i1=i3=0, which means that there are no currents flowing. Accordingly, the MEMS device 22 is protected.

Second, when the break-over voltage $V_{bo}$ of the over voltage protector OP1 is less than the break-over voltage $V_{bo}$ of the over voltage protector OP3, the over voltage protector OP1 will turn on when surge source $V_s$ reaches the break-over voltage $V_{bo}$ of the over voltage protector OP1. Then, the surge current i0 will naturally flow through the over voltage protector OP1. This current will be essentially equal to all surge currents (i.e., i0=i1). The voltage across the over voltage protector OP1, as represented by $V_1$, is $V_{on}$ in the range of 1.0 to 3.0 volts. In this scenario, there is no current flowing through the over voltage protector OP3 (i.e., i3=0) and, hence the MEMS device 22 is protected from surge currents.

Third, when the break-over voltage $V_{bo}$ of the over voltage protector OP1 is greater than the break-over voltage $V_{bo}$ of the over voltage protector OP3, the over voltage protector OP3 will turn on when the surge source $V_s$ reaches the break-over voltage $V_{bo}$ of the over voltage protector OP3. The voltage across the over voltage protector OP3, as represented by voltage $V_3$, is $V_{on}$ in the range of 1.0 to 3.0 volts. The over voltage protector OP1 is kept in the off-state mode until the surge current flowing through the resistor RC1 and the over voltage protector OP3 produces voltage large enough to reach the break-over voltage $V_{bo}$ of the over voltage protector OP1. In other words, the over voltage protector OP1 is kept in the off-state mode, and there is no current flowing through it (i.e., i1=0). In the meantime, the current flowing through the resistor RC1 and the over voltage protector OP3 is the same as the surge current (i.e., i3=i0), and such current will likely damage or destroy the MEMS device 22.

Fourth, when the break-over voltage $V_{bo}$ of the over voltage protectors OP1 and OP3 are exactly the same, which is a rare case, both the over voltage protectors OP1 and OP2 will turn on and the surge current will flow through both protectors. The amount of current flowing through the two protectors will be split between the two, the amount depending on the exact impedance of the circuit. Such current through the resistor RC1 will likely damage or destroy the MEMS device 22.

As detailed above, the conventional systems and methods for protecting MEMS and SSR devices in double end exposed systems are found to be inadequate and unworkable. Accordingly, there is a need for more reliable and efficient systems and methods for protecting MEMS and SSR devices in double end exposed systems due to lightning exposure or electrical power surges.

SUMMARY OF THE INVENTION

In view of the above-described problems of the prior art, it is an object of the present invention to provide systems and methods for protecting MEMS and electronic relay devices due to lightning exposure or electrical power surges in double end exposed systems.

It is yet another object of the present invention to provide systems and methods limiting exposure to high voltages and currents to the MEMS and solid state relay devices in double end exposed systems.

It is a further object of the present invention to provide systems and methods for sensing a high current condition and thereby energizing an over voltage suppressor to protect the MEMS and solid state relay devices in double end exposed systems.

It is another object of the present invention to provide systems and methods to protect metallic cross-connect systems implemented with MEMS and solid state relay devices in double end exposed systems.

These and other objects of the present invention are obtained by providing over voltage suppressors and over current detectors in systems having MEMS or SSR devices. The over voltage suppressors are used to protect against voltage pulses such as lightning or power surge exposure. Similarly, the over current detectors are used to protect against current pulses. The present invention can be implemented to protect any number of MEMS or SSR devices used in connection with double end exposed systems.

BRIEF DESCRIPTION OF THE DRAWINGS

These and other objects and advantages of the present invention will become apparent and more readily appreciated from the following detailed description of the presently preferred exemplary embodiments of the invention taken in conjunction with the accompanying drawings, of which:

FIG. 1 illustrates a simplified block diagram of a conventional single end exposed system;

FIG. 2 illustrates a simplified block diagram of a conventional double end exposed system;

FIGS. 5A and 5B illustrate simplified block diagrams in accordance with the preferred embodiments of the present invention;

DETAILED DESCRIPTION OF THE PREFERRED EMBODIMENTS

Figure 3:
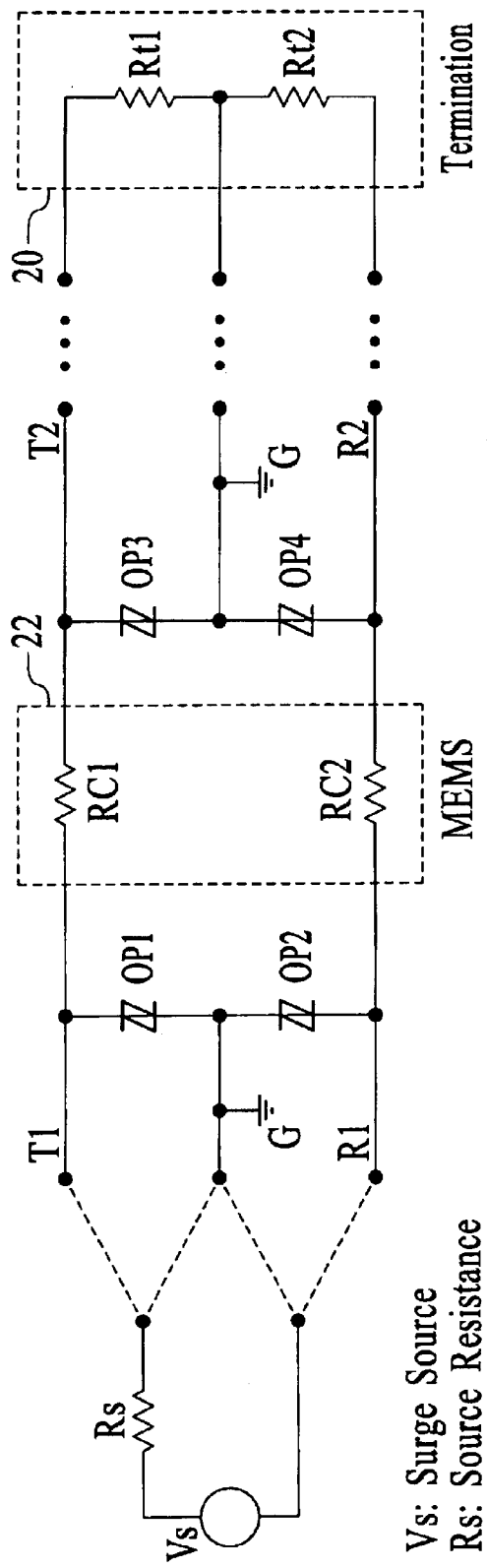
FIG. 3 illustrates a more detailed diagram of the conventional double end exposed system of FIG. 2.

The present invention will now be described in greater detail, which will serve to further the understanding of the preferred embodiments of the present invention. As described elsewhere herein, various refinements and substitutions of the various embodiments are possible based on the principles and teachings herein.

The preferred embodiments of the present invention will be described with reference to FIGS. 5–9, wherein like components are designated by like reference numerals throughout the various figures. Further, specific parameters such as system architecture, circuit layouts, electronic components, component values, and the like are provided herein, and are intended to be explanatory rather than limiting.

The present invention is directed to systems and methods for protecting devices (switching and non-switching) such as MEMS and electronic relay devices in double end exposed systems. In other words, the present invention is directed to systems and methods for protecting MEMS and electronic relay devices due to lightning exposure or electrical power surges, and in particular, the use of these type of devices in telecommunication equipment such as metallic cross connect systems.

The present invention discloses systems and methods for protecting devices have MEMS or SSR devices such as a metallic cross connect system in applications where both the ingress and egress ports are connected to an equipment residing in the outside plant, thereby exposing the device to potential damages caused by lightning and AC power faults. According to the present invention, the MEMS device is protected by insuring that the voltage and current exposed to the device is less than or equal to specification limits of the MEMS device. The MEMS device is protected regardless of any of the four scenarios described in the Background Section of this Specification. This is accomplished by introducing over voltage/over current protectors having over voltage suppressors and over current detectors.

The over voltage suppressors limit/clamp the voltage that is exposed to the MEMS device, and sense resistors are used to sense a high current such that the over current protectors block the high current from damaging or destroying the MEMS device. The over voltage suppressors are also used to protect against voltage pulses such as lightning or power surge exposure. Similarly, the over current protectors are used to protect against current pulses.

FIGS. 5A and 5B illustrate simplified block diagrams in accordance with the preferred embodiments of the present invention. Circuitry described and illustrated in reference to FIGS. 5A and 5B are implemented in double end exposed systems, and operate similarly. The main difference between the circuitry of FIGS. 5A and 5B is that in FIG. 5A the ground G and the M1 and M2 connections of the OVCP-1 and OVCP-2 (defined below) is positioned away from the MEMS device 22, and in FIG. 5B the ground G and the M1 and M2 connections of the OVCP-1 and OVCP-2 is positioned towards the MEMS device 22. As such, the following description will focus only on the circuitry illustrated in FIG. 5A. The following terms are defined as follows for a more complete understanding of the present invention:

Ingress port is identified by terminals T1 and R1;
Egress port is identified by terminals T2 and R2;
OVCP-1 is the over voltage/current protector for the ingress port;
OVCP-2 is the over voltage/current protector for the egress port;
OVS is defined as the over voltage suppressor;
OCD is defined as the over current detector;
R1 and R2 are sense resistors for the ingress port;
R3 and R4 are sense resistors for the egress port;
RC1 and RC2 are equivalent resistance of the MEMS device; and
the OVCP-1 and OVCP-2 should have similar characteristics.

In this diagram, a cross connect or similar unit having MEMS or SSR array (collectively known as "MEMS device 22") therein is positioned in between the OVCP-1 102 and OVCP-2 104. The term "MEMS device 22" used herein can be any electronic, electro-mechanical, etc. device such as MEMS, SSR, and conventional mechanical relay that has switching capabilities.

In greater detail, the MEMS device 22 includes n number of contact pairs, where n represents any number. Each contact is represented by the "x" symbol in the figures, and each contact pair (one from the tip wire and one from the ring wire) represents a controllable entity. Accordingly, the MEMS device 22 as illustrated in FIGS. 5A and 5B includes four controllable entities. Although only four controllable entities are illustrated in the figures for simplicity and ease of explanation, the number of controllable entities in the MEMS device 22 can be more or less than four, depending on the particular system architecture. The current rating of these contacts are relatively low, and the voltage breakdown across open contacts, and between contacts of different pairs, and between contacts and the body of the MEMS device 22, are also relatively low. Therefore, any current and voltage that exceeds a rated value will likely damage the MEMS device 22.

The MEMS device 22 is also connected to a tip (T) and ring (R) pair. The tip and ring pair is used to deliver both voice and/or data services to customers. The MEMS device 22 is typically exposed to a certain level of voltage and current that is tolerable. However, these devices can be easily damaged or destroyed when they are exposed to high voltages or currents. The present invention is intended to protect the MEMS device 22 from damage, and, in particular when implemented in double end exposed systems.

Figure 6:
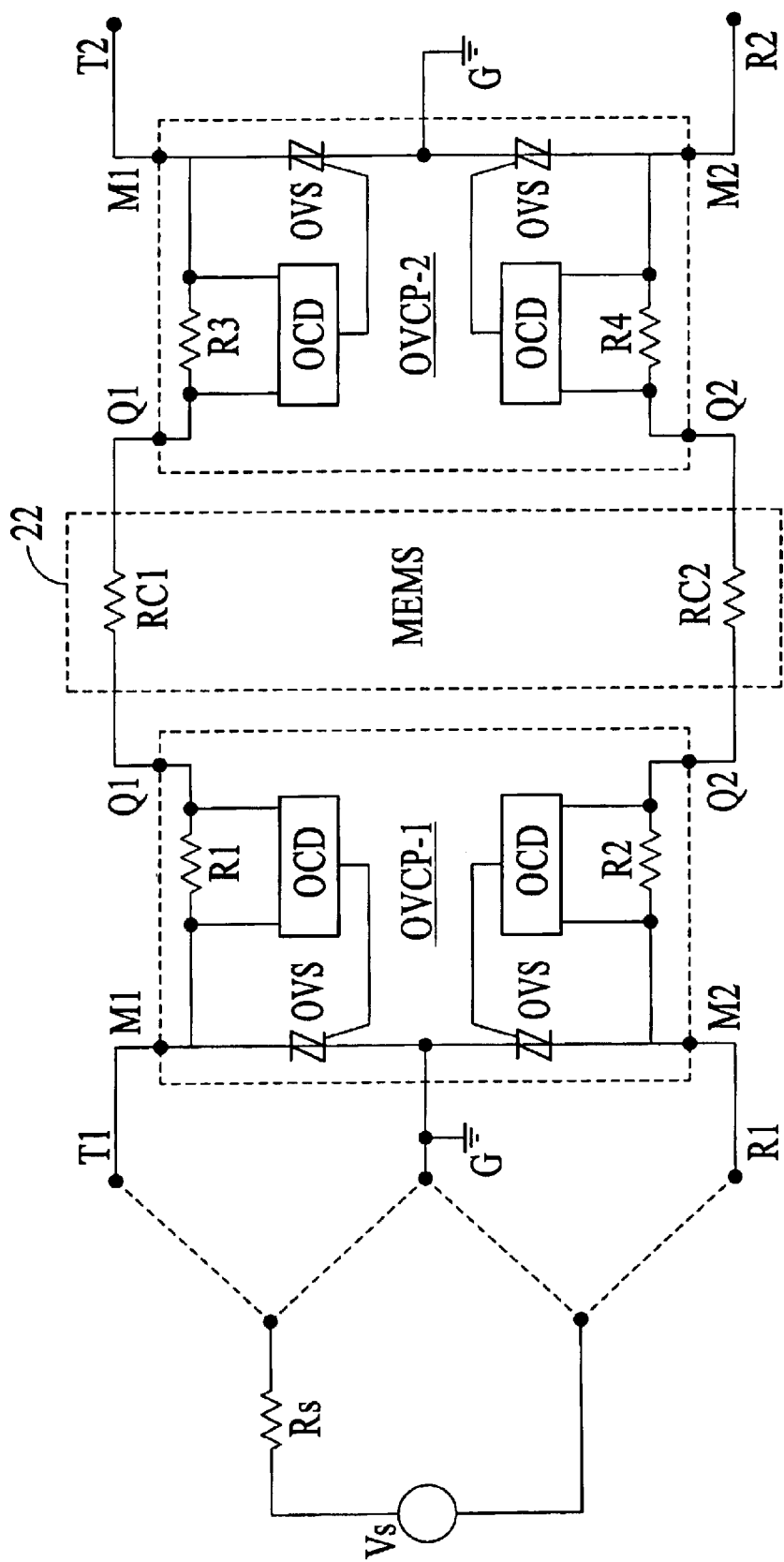
FIG. 6 illustrates a more detailed diagram of the double end exposed system of FIG. 5A.

FIG. 6 illustrates a more detailed diagram of the double end exposed system of FIG. 5A. In particular, FIG. 6 illustrates a more detail diagram of the OVCP-1 102 and OVCP-2 104. Each OVCP consists of two identical circuits with one protecting the tip path and the other the ring path, respectively. Furthermore, the overall circuit topology is symmetrical with respect to ground G.

With reference to OVCP-1 102, it includes an OVS coupled to an OCD, which itself is coupled to a sense resistor R1. The sense resistor R1 is further coupled to the OVS and the tip wire. As described above, the sense resistor R1 senses high currents such that the OCD will generate a signal to trigger OVS so that it can be activated to protect the MEMS device 22. When a lightning exposure or AC power surge occurs, the sense resistor R1 senses the current across it. The OCD compares the resulting voltage with a predefined value and if a threshold is exceeded, a signal is generated to trigger the OVS.

The OVS is used to limit the maximum voltage limit that the MEMS or SSR devices can be exposed. For example, when the voltage increases because of lightning exposure (i.e., 1000 V) or AC power surge, the OVS is used to clamp/limit the voltage to some predetermined maximum value that the MEMS device 22 can handle. The range of this value is between the maximum operating voltage under normal condition (lower limit) and the maximum tolerable voltage (upper limit) of the MEMS device 22. Since the lightning is a very fast event (microsecond), the OVS needs to clamp/limit the voltage and is designed to respond in nanoseconds. The OCD is also a fast detecting device capable of responding to lightning induced currents.

Figure 7:
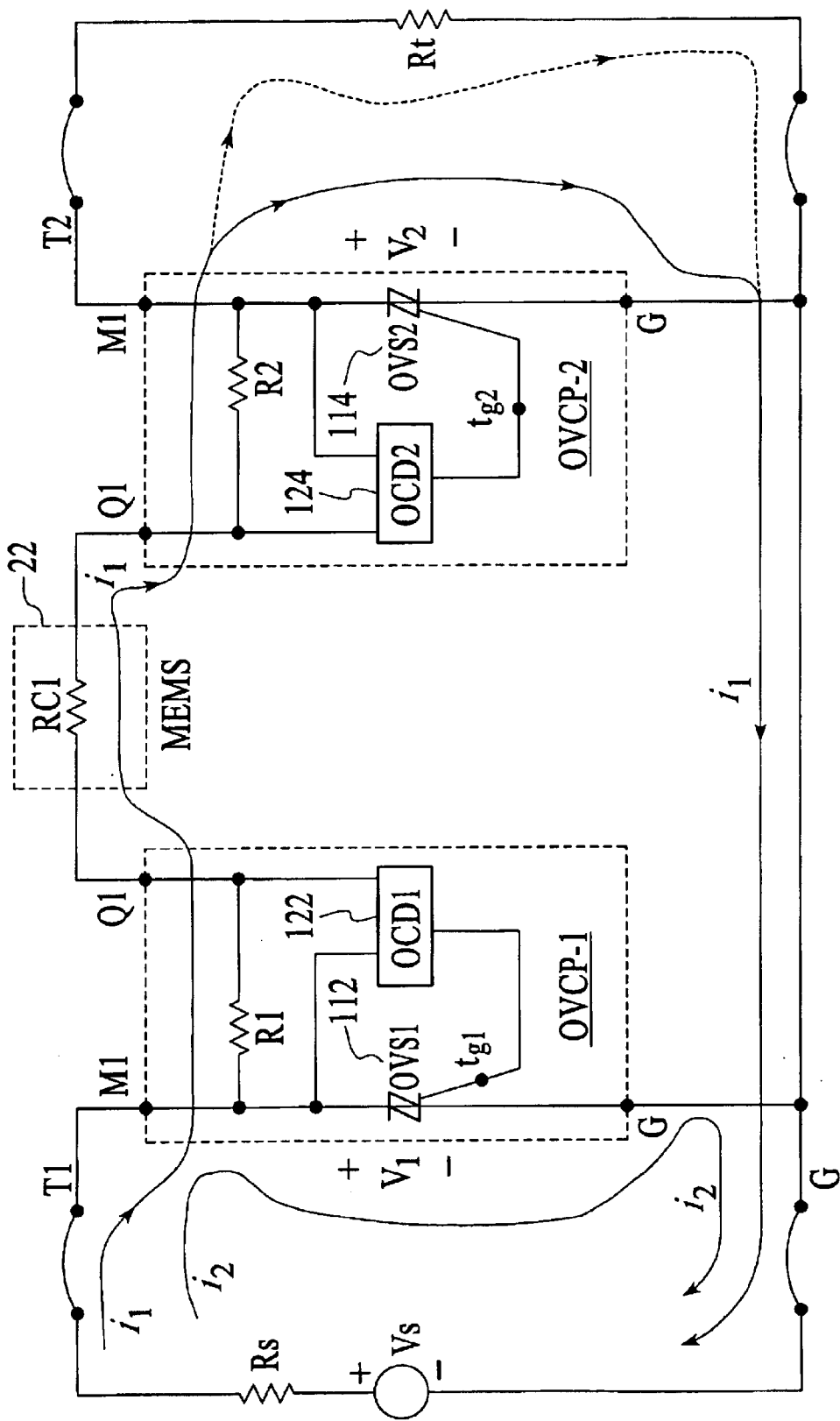
FIG. 7 illustrates an upper half section of the circuitry shown in FIG. 6.

FIG. 7 illustrates an upper half section of the circuitry shown in FIG. 6. Detailed operation description will be provided with respect to FIG. 7, which is also applicable to the ring path. The OVCP for the ingress port is the OVCP-1 and for the egress port is the OVCP-2. The OVS and OCD in the OVCP-1 are represented as OVS1 112 and OCD1 122, respectively. Similarly, the OVS and OCD in the OVCP-2 are represented as OVS2 114 and OCD2 124. The sense resistors R1 and R2 are associated with the OVCP-1 and OVCP-2, respectively.

Figure 4:
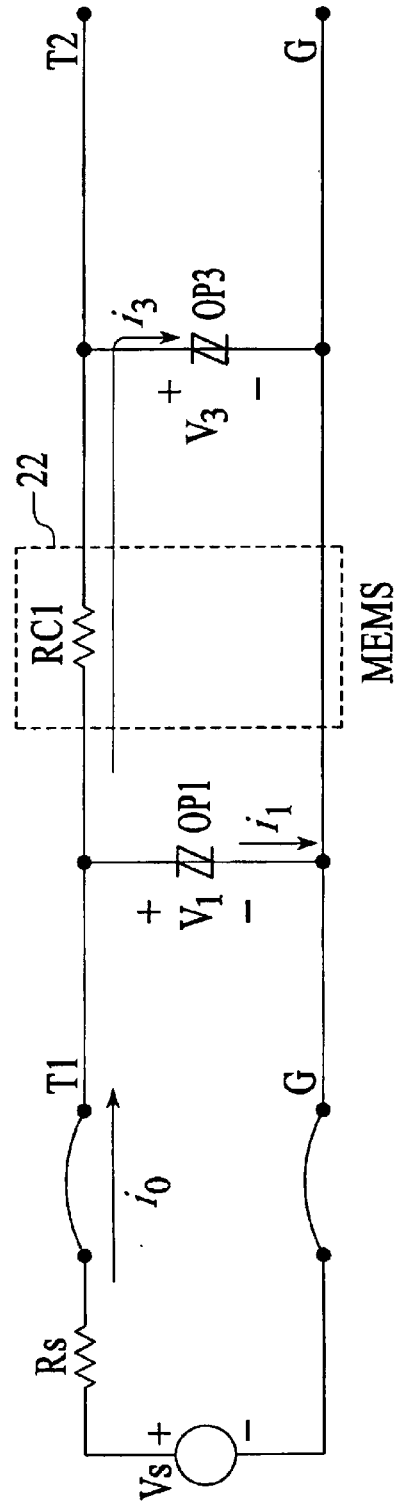
FIG. 4 illustrates a section of the conventional double end exposed system of FIG. 3.

The OVS limit/clamp the voltage that is exposed to the MEMS device 22. The voltage characteristics and operation behavior for the OVP as previously discussed in the context of FIG. 4 are also applicable to the OVS. The parameters $V_{drm}$, $V_{bo}$, and $V_{on}$ are also applicable to the OVS as described earlier. However, the OVS differs from the OVP in that that the OVS can be turned-on by an external triggering signal (i.e., tg1 for OVCP-1 and tg2 for OVCP-2).

The OCD senses the current flowing in the sense resistor R. If the current exceeds a threshold value, a triggering signal tg is generated and is used to turn on the OVS. When the OVS is turned on, current will be diverted from the sense resistor to flow thorough the OVS, and hence protect devices, such as the MEMS device 22, that are connected in series with the sense resistor R. The OCD current detection threshold value is chosen to protect the MEMS device (RC1) 22 from being damaged or destroyed.

An overall system operation behavior will now be described with reference to FIG. 7. A surge source, as represented by $V_s$ and Rs, is connected to the ingress port at terminals T1 and ground G. An equivalent load, Rt, is connected to the egress port at terminals T2 and ground G. The resistor RC1 represents the MEMS device 22 that requires protection. The generator current can flow in the path established by current path i1 and/or i2. Ideally, the surge current should flow in a path defined by current i2 to protect the resistor RC1.

When the surge generator is applied to terminals T1 and ground G, the circuit behavior is dependent on the charac-teristics of OVCP-1 and OVCP-2. The scenarios as discussed earlier are repeated herein as follows.

First, when the surge source $V_s$ is less than the break-over voltage $V_{bo}$ of either the OVS1 112 or OVS2 114, both OVS1 112 and OVS2 114 remain in the off-state modes, and there will be no current flowing out of ground G of OVCP-1 and OVCP-2. The surge current can then flow through resistors R1, RC1, R2, and Rt, and as indicated by current i1. The magnitude of current i1 is dependent on the value of Rt. If the value of current i1 reaches the prescribed threshold of OCD1 122, a triggering signal tg1 is generated, and OVS1 112 is turned on. Then, all surge currents are diverted away from the MEMS device 22. The voltage across OVS1 112 as represented by V1 is $V_{on}$ in the range of 1.0–3.0 volts. Nearly all surge current will now flow as current i2, and accordingly, the MEMS device 22 will be protected. This mechanism protects the MEMS device 22 from over current damage regardless of the voltage.

Second, when the break-over voltage $V_{bo}$ of OVS1 112 is less than the break-over voltage $V_{bo}$ of the OVS2 114, the OVS1 112 will turn on when $V_s$ reaches its $V_{bo}$. The surge current will flow as current i2. The voltage V1 across OVS1 112 is $V_{on}$ 1, in the range of 1.0–3.0 volts, which indicates the on-state voltage. The current i1 through the resistor RC1 is near zero or relatively small depending on the value of the resistor Rt. Again, the MEMS device 22 will be protected, and this method insures that the voltage and current of the MEMS device 22 are not exceeded.

Third, when the break-over voltage $V_{bo}$ of the OPS1 112 is greater than the break-over voltage $V_{bo}$ of OPS2 114, this will result in the undesirable scenario causing OVS2 114 to turn on before OVS1 112 is turned on. As $V_s$ reaches the $V_{bo}$ of OVS2 114 before that of OVS1 112, OVS2 114 will turn on. The surge current will flow as current i1. The voltage V2 across OVS2 114 is $V_{on}$, and the OVS2 114 will carry nearly all the surge currents. The surge currents as current i1 will flow through the resistor R1, and when it reaches the threshold of OCD1 122, the triggering signal tg1 is generated. In turn, this signal triggers OVS1 112 to the on-state mode and diverts all or nearly all of the surge away from the resistor RC1, thereby preventing damage to the MEMS device 22. The surge currents will then flow through OVS1 112. This method protects the MEMS device 122 from over-voltage and over-current damages.

Fourth, when the break-over voltage $V_{bo}$ of the OVS1 112 and OVS2 114 are exactly the same, it is possible for both OVS1 112 and OVS2 114 to turn on simultaneously. In this case, the surge is flowed as currents i1 and i2. Due to finite resistance value attributed to the sum of resistors R1, RC1, and R2, combined with the on-state behavior of the OVS1 112 and OVS2 114, nearly all surge currents will flow through OVS1 112, and the current flowing through RC1 will be greatly reduced. Again, the MEMS device 122 is protected.

Due to the symmetrical nature of the circuit topology, the ingress and egress ports can be interchanged and the description provided above is equally applicable. Furthermore, the direction of the current flow as depicted by currents i1 and i2, and the voltage polarities as exemplified by V1 and V2, shown in FIG. 7, can be reversed, and the circuit operation as described herein are valid.

The circuit topology for the OVCP consists of two circuit elements with each having blocks designated as OVS and OCD, respectively. The OVS is a solid state device having a designed in-voltage breakdown threshold so that when it is exceeded, the OVS will turn itself on. In addition, the OVS can also be induced to turn on with a trigger signal. These two features combine to have very similar characteristics of a TRIAC. A TRIAC is a particular configuration belonging to the TYRISTOR family of solid state devices, which have been available as industry standard products.

Figures 8, 9A, 9B:
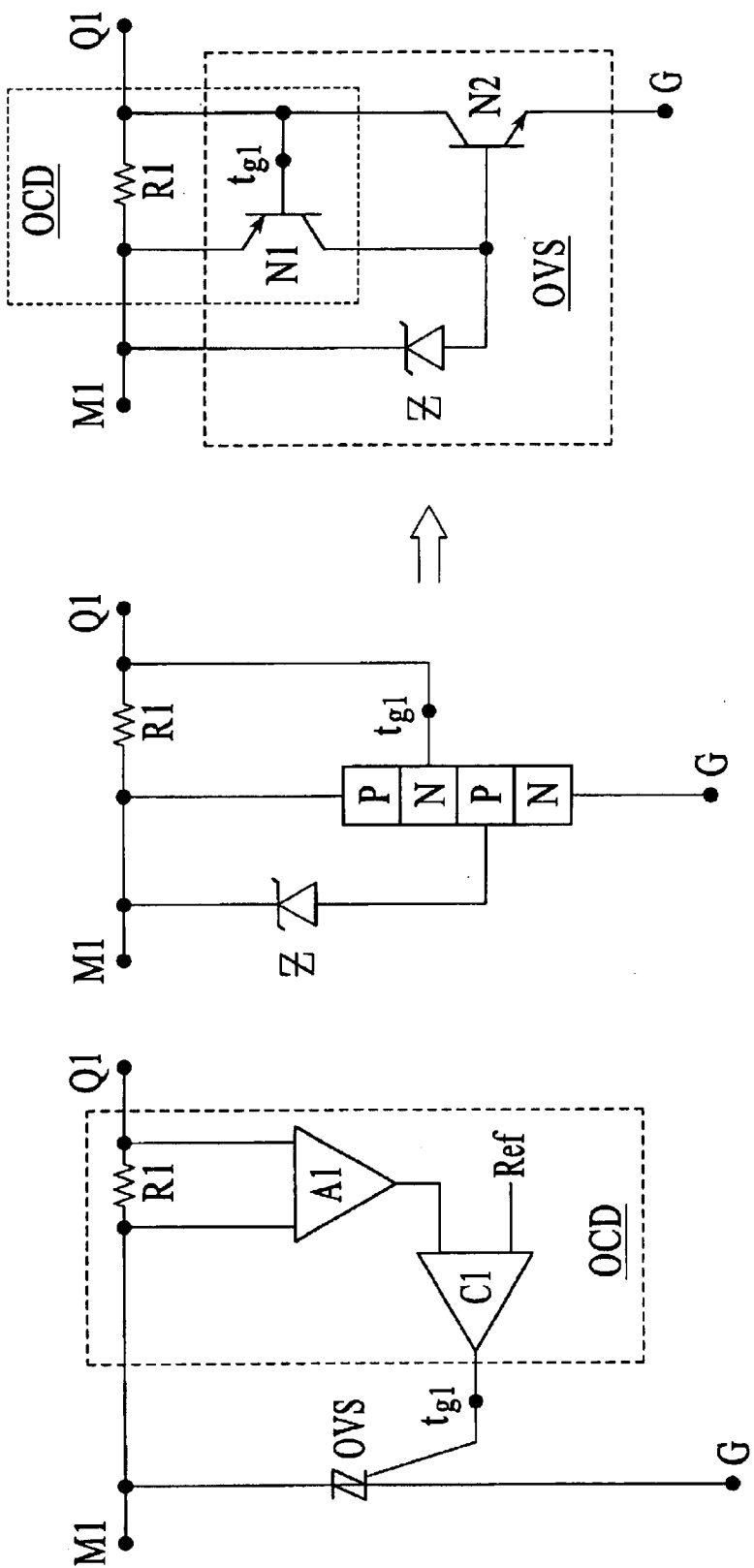
FIG. 8 illustrates a detailed circuit diagram of an over voltage suppressor and an over current detector in accordance with one embodiment of the present invention.
FIGS. 9A and 9B illustrate detailed circuit diagrams of an over voltage suppressor and an over current detector in accordance with another embodiment of the present invention.

FIG. 8 illustrates a detailed circuit diagram of an over voltage suppressor and an over current detector in accordance with one embodiment of the present invention. The OVS is similar to a TRIAC, and an OCD is implemented with standard operational amplifier and comparator. In greater detail, the OCD consists of amplifier A1 connected across the resistor R1. The amplifier A1 is also connected to a comparator C1, which output is coupled to the OVS. The comparator C1 compares output of the amplifier A1 to a reference voltage, which is selected to be proportional to the over current threshold.

FIGS. 9A and 9B illustrate detailed circuit diagrams of an over voltage suppressor and an over current detector in accordance with another embodiment of the present invention. FIGS. 9A and 9B illustrate an implementation combining the OVS and OCD functions into one integrated design. FIG. 9A illustrates a Tyristor structure and FIG. 9B is the equivalent circuit diagram. The OVS consists of zener diode Z and transistors N1 and N2. The zener diode Z defines the $V_{bo}$.

The OCD consists of a sense resistor R1, and the PN junction of transistor N1. The OCD threshold is defined by the combination of base-to-emitter voltage drop ($V_{be}$) of transistor N1 and the value of resistor R1. The above described components with reference to FIGS. 8, 9A and 9B are well known components.

In the previous descriptions, numerous specific details are set forth such as system architecture, circuit layouts, electronic components, component values, etc. to provide a thorough understanding of the present invention. However, as one having ordinary skill in the art would recognize, the present invention can be practiced without resorting to the details specifically set forth.

Although only the above embodiments have been described in detail above, those skilled in the art will readily appreciate that many modifications of the exemplary embodiments are possible without materially departing from the novel teachings and advantages of this invention.

I claim:

1. A method for protecting a device against damage resulting from an electrical power fault in a double end exposed system, wherein the device is positioned in a copper loop in a telecommunication network, the method comprising:

detecting a current in the copper loop in the double end exposed system;

comparing the sensed current with a threshold current associated with the device using an over current detector coupled to the copper loop, the over current detector comprising a comparator and an amplifier;

diverting the current flow from the device to an over voltage suppressor if the value of the sensed current is greater than the value of the threshold current; and limiting an electrical power fault voltage that is exposed to the device using the over voltage suppressor.

2. A method according to claim 1, wherein detecting the current comprises sensing the current across a resistor coupled to the copper loop.

3. A method according to claim 1, wherein an output of the amplifier is coupled to an input of the comparator.

4. A method according to claim 1, wherein the electrical power fault includes lightning exposure.

5. A method according to claim 1, wherein the electrical power fault includes an electrical power surge.

6. A method according to claim 1, wherein the device comprises a micro electrical-mechanical system (MEMS).

7. A method according to claim 1 further comprising protecting the device against voltage pulses using the over voltage suppressor.

8. A method according to claim 1 further comprising protecting the device against current pulses using the over current detector.

9. A apparatus for protecting a device against damage resulting from an electrical power fault, the device being positioned in a copper loop in a telecommunication network, the apparatus comprising:

a sensing resistor for detecting a current in the copper loop in a double end exposed system;

an over current detector for detecting and comparing the sensed current with a threshold current associated with the device, wherein the over current detector comprises an amplifier coupled to a comparator and diverts the current flow from the device if the value of the sensed current is greater than the value of the threshold current; and an over voltage suppressor for receiving the diverted current flow, and wherein the over voltage suppressor comprises a TRIAC and limits an electrical power fault voltage that is exposed to the device.

10. An apparatus according to claim 9 wherein the over current detector is adapted to generate a signal to trigger the over voltage suppressor.

11. An apparatus according to claim 9, wherein an output of the amplifier is coupled to an input of the comparator.

12. An apparatus according to claim 9, wherein the over voltage suppressor is adapted to protect the device against voltage pulses.

13. An apparatus for protecting a device against damage resulting from an electrical power fault, the device being positioned in a copper loop in a telecommunication network, the apparatus comprising:

a sensing resistor for detecting a current in the copper loop in a double end exposed system;

an over current detector for detecting and comparing the sensed current with a threshold current associated with the device, wherein the over current detector diverts the current flow from the device if the value of the sensed current is greater than the value of the threshold current; and an over voltage suppressor for receiving the diverted current flow, and wherein the over voltage suppressor comprises a zender diode coupled to a pair of transistors and limits an electrical power fault voltage that is exposed to the device.

14. An apparatus according to claim 13, wherein the over current detector comprises an PN junction of one of the pair of transistors.

15. A system for protecting a device against damage resulting from an electrical power fault in a double end exposed system, wherein the device is positioned in a copper loop in a telecommunication network, the system comprising:

means for detecting a current in the copper loop in the double end exposed system, wherein the means for detecting the current comprises an over current detector coupled to a sensing resistor on the copper loop, and wherein the over current detector comprises an amplifier coupled to a comparator;

means for comparing the sensed current with a threshold current associated with the device;

means for diverting the current flow from the device to an over voltage suppressor if the value of the sensed current is greater than the value of the threshold current, wherein the over voltage suppressor comprises a TRIAC; and means for limiting an electrical power fault voltage that is exposed to the device using the over voltage suppressor.

16. A system according to claim 15, wherein the means for comparing the sensed current with the threshold current comprises using the over current detector.

17. A system according to claim 16, wherein the over current detector is adapted to generate a signal to trigger the over voltage suppressor.

18. A system according to claim 15, wherein an output of the amplifier is coupled to an input of the comparator.

19. A system according to claim 15, wherein the device comprises a micro electrical-mechanical system (MEMS).

20. A system for protecting a device against damage resulting from an electrical power fault in a double end exposed system, wherein the device is positioned in a copper loop in a telecommunication network, the system comprising:

means for detecting a current in the copper loop in the double end exposed system, wherein the means for detecting the current comprises an over current detector coupled to a sensing resistor on the copper loop;

means for comparing the sensed current with a threshold current associated with the device;

means for diverting the current flow from the device to an over voltage suppressor if the value of the sensed current is greater than the value of the threshold current, wherein the over voltage suppressor comprises a zener diode coupled to a pair of transistors; and means for limiting an electrical power fault voltage that is exposed to the device using the over voltage suppressor.

21. A system according to claim 20, wherein the over current detector comprises an PN junction of one of the pair of transistors.

* * * * *